United States Patent [19]

Blakemore

[11] Patent Number: 4,763,544

[45] Date of Patent: Aug. 16, 1988

[54] INFINITELY VARIABLE POSITIVE MECHANICAL TRANSMISSION

[76] Inventor: John H. Blakemore, 11213 S. Taylor St., Oak Park, Ill. 60304

[21] Appl. No.: 609,235

[22] Filed: May 11, 1984

Related U.S. Application Data

[63] Continuation-in-part of Ser. No. 171,706, Jul. 24, 1980, abandoned.

[51] Int. Cl.[4] .............................................. F16H 3/74
[52] U.S. Cl. ..................................... 74/752 E; 74/794
[58] Field of Search ...................... 74/752 E, 794, 731, 74/123; 192/61, 58 B; 188/82.3, 82.34

[56] References Cited

U.S. PATENT DOCUMENTS

| | | | |
|---|---|---|---|
| 887,781 | 5/1908 | Fischer | 74/794 |
| 1,123,786 | 1/1915 | Norris | 188/82.3 |
| 1,279,659 | 9/1918 | Cotterman | 74/752 E X |
| 1,899,999 | 3/1933 | Uhlich et al. | 74/752 E |
| 2,017,526 | 10/1935 | Burnett | 188/82.3 X |
| 2,022,689 | 12/1935 | Rainsford | 74/752 E X |
| 2,091,391 | 8/1937 | Hale | 74/752 E X |
| 2,151,151 | 3/1939 | Perez | 74/752 E X |
| 2,350,416 | 6/1944 | Perry | 74/677 X |
| 2,500,763 | 3/1950 | Lowndes | 74/752 E X |
| 2,590,635 | 3/1952 | McAlister | 74/752 E |
| 2,597,854 | 5/1952 | Cross et al. | 74/752 E |
| 3,109,326 | 11/1963 | Holtan | 74/752 E X |
| 3,511,113 | 5/1970 | Rheault | 192/61 X |
| 3,899,941 | 8/1975 | Cook | 74/781 R |
| 4,181,044 | 1/1980 | Read | 74/752 E |
| 4,368,651 | 1/1983 | Bednar | 74/752 E |

FOREIGN PATENT DOCUMENTS

| | | | |
|---|---|---|---|
| 671642 | 12/1929 | France | 192/61 |
| 1147720 | 11/1957 | France | 74/752 |
| 516122 | 12/1939 | United Kingdom | 74/794 |

Primary Examiner—Leslie A. Braun
Assistant Examiner—David Novais
Attorney, Agent, or Firm—Sherman and Shalloway

[57] ABSTRACT

Disclosed herein are two embodiments of transmissions. In a first embodiment, a transmission is provided in which the input shaft and output shafts are mounted for rotation with respect to each other on a common shaft, and power is transmitted from the input shaft to the output shaft utilizing the gear on the output shaft meshed with an idler gear, the idler gear being coupled to the input shaft through a wobble plate mounted on the input shaft and the connecting rod coupled between the wobble plate and the idler gear. In one aspect of this embodiment, a plurality of idler gears are meshed with the gear on the output shaft and each of the idler gears is coupled to the wobble plate through a connecting rod and a one-way gear or brake. In a second embodiment of the present invention, a transmission is provided which may transmit power from an input shaft to an output shaft in a direct manner or alternatively through a predetermined low gear ratio, or through the use of a unique variable hydraulic torque converter at gear ratios continuously variable between unity and the aforesaid low gear ratio. The torque converter of this embodiment utilizes the interaction of variably extensible pawls with a static fluid to vary the torque responsive to the sensed output load as well as to the speed of rotation of the input shaft.

18 Claims, 7 Drawing Sheets

INFINITELY VARIABLE POSITIVE MECHANICAL TRANSMISSION

This application is a continuation-in-part of Application Ser. No. 171,706 filed July 24, 1980, now abandoned.

BACKGROUND OF THE INVENTION

The present invention relates generally to embodiments of transmissions, and particularly to transmissions which may achieve a continuously variable output torque.

In both industrial and consumer applications, it is often necessary to provide a transmission between a source of power and the load in order to provide an adjustable torque. Typical examples of such devices are automobiles and tractors. Conventional transmissions used in such devices employ selectable gears, or fluid clutches. In years gone by, arrangements of belts and pulleys were used to provide an adjustable torque. Selectable gears are efficient in transmitting power between the input shaft and the output shaft, but are considered by many to be somewhat inconvenient since it is necessary to remove the load from the shaft with a clutch to change gear ratios. Planetary gear arrangements have also been employed, and planetary gears in combination with fluid clutches have provided transmissions with reasonable efficiency, although complicated and expensive to construct.

OBJECTS OF THE INVENTION

It is an object of the invention to provide a transmission which is highly efficient and which provides the ability to vary the torque between the input and output shafts. In addition, it is an object of the present invention to provide such a transmission in which the torque may be continuously varied, even while maintaining the transmission under load. It is a further object of the present invention to provide such a transmission in a first embodiment which may be reversed, even while maintaining the transmission under load.

It is a further object of the present invention to provide a second embodiment of transmission which combines various aspects of positive drive and continuously variable torque output. Additionally, it is an object of the present invention to provide such a transmission which is simple to construct, relatively inexpensive, and durable.

SUMMARY OF THE INVENTION

The present invention comprises, in a first embodiment, a transmission in which the input shaft and output shafts are mounted for rotation with respect to each other on a common axis, and power is transmitted from the input shaft to the output shaft utilizing a gear on the output shaft meshed with an idler gear, the idler gear being coupled to the input shaft through a wobble plate mounted on the input shaft and a connecting rod coupled between the wobble plate and the idler gear. In a preferred construction of the present invention, a plurality of idler gears are meshed with the gear on the output shaft, and each of the idler gears is coupled to the wobble plate through a connecting rod and a one-way gear or brake.

In a second embodiment, a transmission is provided which may transmit power from an input shaft to an output shaft in a direct manner, or, alternatively, through a predetermined low gear ratio, or through the use of a unique variable hydraulic torque converter at gear ratios continuously variable between unity and the aforesaid low gear ratio. The variable hydraulic torque converter utilizes the interaction of variably extensible pawls with a static fluid to vary the torque responsive to the sensed output load.

The present invention will be understood from the following specification and the accompanying drawings, in which.

As illustrated in FIGS. 1-5, the first transmission embodiment has a housing 10 with aligned apertures 12 and 14 on opposite sides thereof. A drive shaft, or input shaft, 16 is journaled within the aperture 12, and a driven shaft, or output shaft 18, is journaled within the aperture 14. The output shaft 18 carries a helical gear 20 at its inner end, the helical gear 20 being mounted with its central axis coaxial with the output shaft 18. The helical gear 20 is provided with a cylindrical cavity 22 which extends therein along the central axis thereof, and the cavity 22 accommodates a cylindrical stub 24 protruding coaxially from the end of the input shaft 16, the stub 24 being journaled in the cavity 22, thereby maintaining the drive shaft 16 and driven shaft 18 coaxial and rotatable with respect to each other.

The aperture 14 in the housing extends through a wall 26 at one side of the housing, and four partitions 28, 30, 32 and 34 extend inwardly from the wall 26 to confront different sides of the helical gear 20. Each of the partitions has two flat walls 36 and 38 disposed normal to each other and in planes parallel to the axes of the drive shaft 16 and driven shaft 18. The walls 36 of partitions 28 and 34 are disposed in the same plane, and this plane is parallel to a plane which contains the walls 36 of partitions 30 and 32. In like manner, the wall 38 of partition 34 is disposed in the same plane as the wall 38 of partition 32, and the walls 38 of partitions 28 and 30 are disposed in the same plane parallel to the plane of the walls 38 of partitions 32 and 34.

The walls 36 of partitions 28 and 30 are provided with aligned apertures 40 which accommodate a pin 42. The pin 42 is journaled within the apertures 40, and carries a helical gear 44 which is meshed with the helical gear 20. The helical gear 44 is journaled for rotation on the pin 42, and a pair of side plates 46 and 48 of a housing 50 are also provided with apertures 52 and 54 which are journaled about the pin 42 for rotation with respect thereto. The housing 50 also has a second pair of side plates 56 and 58, the plate 56 being spaced from and adjacent to the plate 46 and the plate 58 being spaced from and adjacent to the plate 48. The plate 56 is maintained in position with respect to the plate 46 by means of a spacer 60 which is secured between the plates 46 and 56, and the plate 58 is maintained in position with respect to the plate 48 by means of a second spacer 62 secured thereto. A pin 64 extends between the plates 46 and 56 adjacent to the perimeter of the helical gear 44, and a second pin 66 extends between the plates 48 and 58 in alignment with the pin 64. One end of a connecting rod 68 is bifurcated into two parallel portions 70 and 72. The portion 70 has an aperture 74 which accommodates the pin 64, and the portion 72 has an aperture 76 which accommodates the pin 66. Hence, the portions 70 and 72 are journaled on the pins 64 and 66 and thus secured on the housing 50.

The connecting rod 68 is disposed in a common plane with the drive shaft 16 and driven shaft 18 and is generally parallel to the axis of these shafts. The end of the connecting rod 68 opposite the housing 50 is mounted on a wobble plate 78 which is caused to wobble in synchronism with rotation of the drive shaft 16, as will be hereinafter described. As a result of wobbling of the wobble plate 78, the connecting rod 68 causes the housing 50 to oscillate back and forth on the shaft 42. The housing 50 is coupled to the helical gear 44 by means of a one-way gear 80 or one-way brake to be described hereinafter.

The wobble plate 78 utilizes a cylindrical disk 82 with a central aperture 84 which accommodates the input or drive shaft 16. A pin 86 extends centrally through the aperture 84 and through a bore 88 which extends through the central axis of the drive shaft 16, thereby securing the wobble plate 78 on the drive shaft. The aperture 84 in the disk 82 of the wobble plate 78 is shaped to permit the wobble plate to pivot with respect to the drive shaft 16.

The disk 82 has a flat cylindrical periphery 90, and a pair of grooves 92 and 94 are disposed adjacent to the periphery 90 and form races for balls 96. A U-shaped cylindrical cap 98 is disposed about the perimeter of the disk 82, and the cap contains grooves 100 and 102 which form races for the balls 96. Hence the cap is free to rotate with respect to the disk 82.

The cap is provided with an outwardly extending pin 104 on which a substantially spherical body 106 is mounted. The end of the connecting rod 68 opposite the housing 50 is journaled about the spherical body 106 by means of a mating opening 108 in an end hub 110 of the connecting rod 68. The connecting rod 68 is thus free to translate the wobbles from the wobble plate 78 to the housing 50.

The angle of the wobble plate with respect to the drive shaft 16 is controlled by a lever 112 which is pivotally mounted by means of a pin 114, the pin being secured on a structural rib 116 extending inwardly from the housing 10. A sleeve 118 is translatively disposed about the drive shaft 16. The sleeve 118 carries a ball bearing assembly 122 mounted in fixed position on the sleeve, and the assembly 122 has a collar or outer race 120. The end of the lever 112 is mounted on the collar 120 by means of a pin 124 and a lever arm 126. The end of the sleeve 118 adjacent to the wobble plate 78 is connected to the wobble plate by means of an arm 126 which extends from the sleeve normal to the drive shaft 16 and a link 128 pivotally connected by means of pins 129A and 129A.

The drawings illustrate a particular one-way brake 80 for coupling the connecting rods 68 to the helical gear 44, but it should be understood that other types of one-way clutches may also be employed. The particular one-way brake 80 illustrated is of particular advantage due to its simple construction, low cost and reversibility. The one-way brake 80 utilizes a rod 130 which extends through the side plates 46 and 48 of the housing 50, and the rod is rotatable with respect to the side plates 46 and 48. A casing 132 is mounted on the rod 130 between the side plates 46 and 48, and is affixed to the rod and rotates with the rod. The casing 132 has a pair of side walls 134 and 136 which depend from the rod 130 and a pair of end walls 138 and 140 which extend between the side walls 134 and 136 to form a rectangular housing. A pin 142 extends centrally between the end walls 138 and 140, and a helical gear 144 is journaled on the pin 142. The helical gear 144 engages the perimeter of the helical gear 44.

The rod 130 is connected to a mechanism for pivoting the casing 132 with respect to an axis normal to the drive shaft 16 and driven shaft 18, this mechanism being designated 146. If the pin 142 is disposed parallel to the tangent to the helical gear 44 at the point of contact of the helical gear 44 and the helical gear 144, then the gear 144 tends to rotate with the helical gear 44 whereby torque cannot be transmitted between the gears 144 and 44. However, if the mechanism 146 pivots the pin 142 from such position parallel to the tangent to the helical gear thus causing one end of the helical gear 144 to tightly engaging the helical gear 44 and releasing the other end of the helical gear 144 from the helical gear 44, then the helical gear 144 will act as a latch to prevent rotation of the helical gear 44 in one direction, but will permit rotation in the reversed direction. When one end of the helical gear 144 tightly engages the helical gear 144 acts as a latch with respect to helical gear 44 for rotation of the helical gear 44 toward the lower or tightly engaging edge of the helical gear but the helical gear 144 will permit rotation of the helical gear 44 toward the edge of the helical gear 144 which is released from the gear 144.

Accordingly, wobbling of the wobble plate 78 causes the connecting rod 68 to reciprocate, thus driving the housing 50 in a periodic motion on the shaft 42. The one-way brake 80 will transmit the reciprocal motion of the connecting rod 68 to the helical gear 44 in either direction depending upon the angle at which the helical gear 144 is positioned by the pivot mechanism 146. Since the helical gear 44 drives the helical gear 20 and the driven shaft 18, the direction of rotation in response to a unidirectional drive on the drive shaft 16 may be controlled by the pivot mechanism 146.

In the particular embodiment of the present invention, the pivot mechanism 146 utilizes a spring steel member 148 which is attached to one end of the rod 130 and depends therefrom. The opposite end of the spring steel member engages a pawl 150 mounted on a flat surface of a bevel gear 152. The bevel gear 152 is secured on the pin 42, and the pin 42 extends to a control lever 154.

In the present construction, it is not contemplated that the connecting rod 68 will rotate the helical gear 44 throughout 360° of rotation, and the present construction contemplates drive for the helical gear of no more than 90°. Accordingly, the transmission is provided with a plurality of helical gears identical to the helical gear 44 to drive the output shaft through a substantial portion of the 360° cycle. In the particular construction, these additional helical gears are designated 44A, 44B, and 44C. The helical gear 44A is journaled on a pin 42A which is rotatably mounted between the walls 38 of the partition 28 and partition 34. In like manner, the helical gear 44B is journaled on a pin 42B which is rotatably mounted between the walls 36 of the partitions 34 and 32. Likewise, the helical gear 44C is journaled on a pin 42C rotatably mounted on the walls 38 of the partitions 32 and 30. Each of the helical gears 44A, 44B, and 44C is coupled to a connecting rod 68A, 68B, or 68C, respectively, and the connecting rods are coupled to the cap 98 of the wobble plate 78 in a manner identical to the connecting rod 68 at locations equally spaced about the perimeter of the cap 98. Also, each of the connecting rods 68A, 68B, and 68C is coupled to the helical gear 44A, 44B, and 44C by means of a one-way gear or brake 80A, 80B, or 80C, respectively, the one-way gear being identical to the one-way gear 80.

It is necessary for each of the one-way gears 80A, 80B and 80C to be provided with a pivot mechanism similar to the pivot mechanism 146 operable with the one-way gear 80. The one-way gear 80A has a depending spring steel member 148A, which engages a pawl 150A on the flat surface of a bevel gear 156. The bevel gear 156 meshes with the bevel gear 158 mounted on the end of the pin 42 opposite the bevel gear 152 to transmit rotational motion from the lever 154 to the bevel gear 156. The bevel gear 156 is mounted on one end of the pin 42A, and a bevel gear 160 is mounted on the opposite end of the shaft 42A. The bevel gear 160 is meshed with a bevel gear 162 mounted on the opposite end of the shaft 42B. The bevel gear 164 is meshed with the bevel gear 166 mounted on one end of the pin 42C, the opposite end of the pin 42C carrying a bevel gear 168 which is meshed with the bevel gear 152 on the pin 42.

The one-way gear 80B is provided with a spring steel member 148B which engages a pawl 150B on the bevel gear 162 to provide actuation of the pivot mechanism 146B. In like manner, a spring steel member 148C of a pivot mechanism 146C for the one-way gear 80C extends to a pawl 150C on the back of bevel gear 166.

In order to provide redundancy, the one-way gear 80 is provided with a second pivot mechanism 170 operating from the end of the rod 130 opposite the pivot mechanism 146, the pivot mechanism 170 being identical in construction to the pivot mechanism 146. In like manner, the one-way gear 80A is provided with a redundant pivot mechanism 170A, the one-way gear 80B is provided with a redundant pivot mechanism 170B, and the one-way gear 80C is provided with a redundant pivot mechanism 170C.

Figure 1:
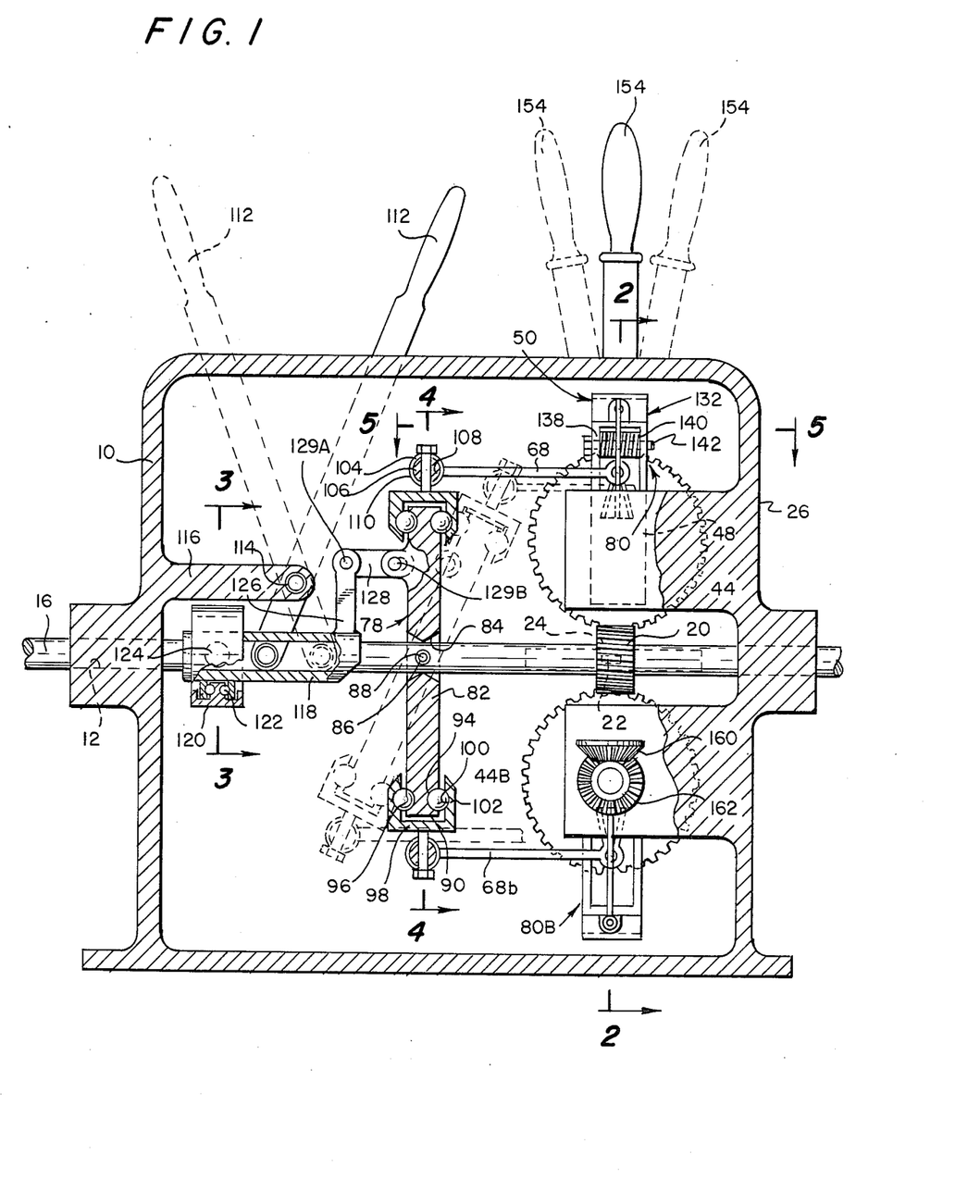
FIG. 1 is a sectional view taken along the axis of the input or drive shaft of the first embodiment of the present invention.
Figure 2:
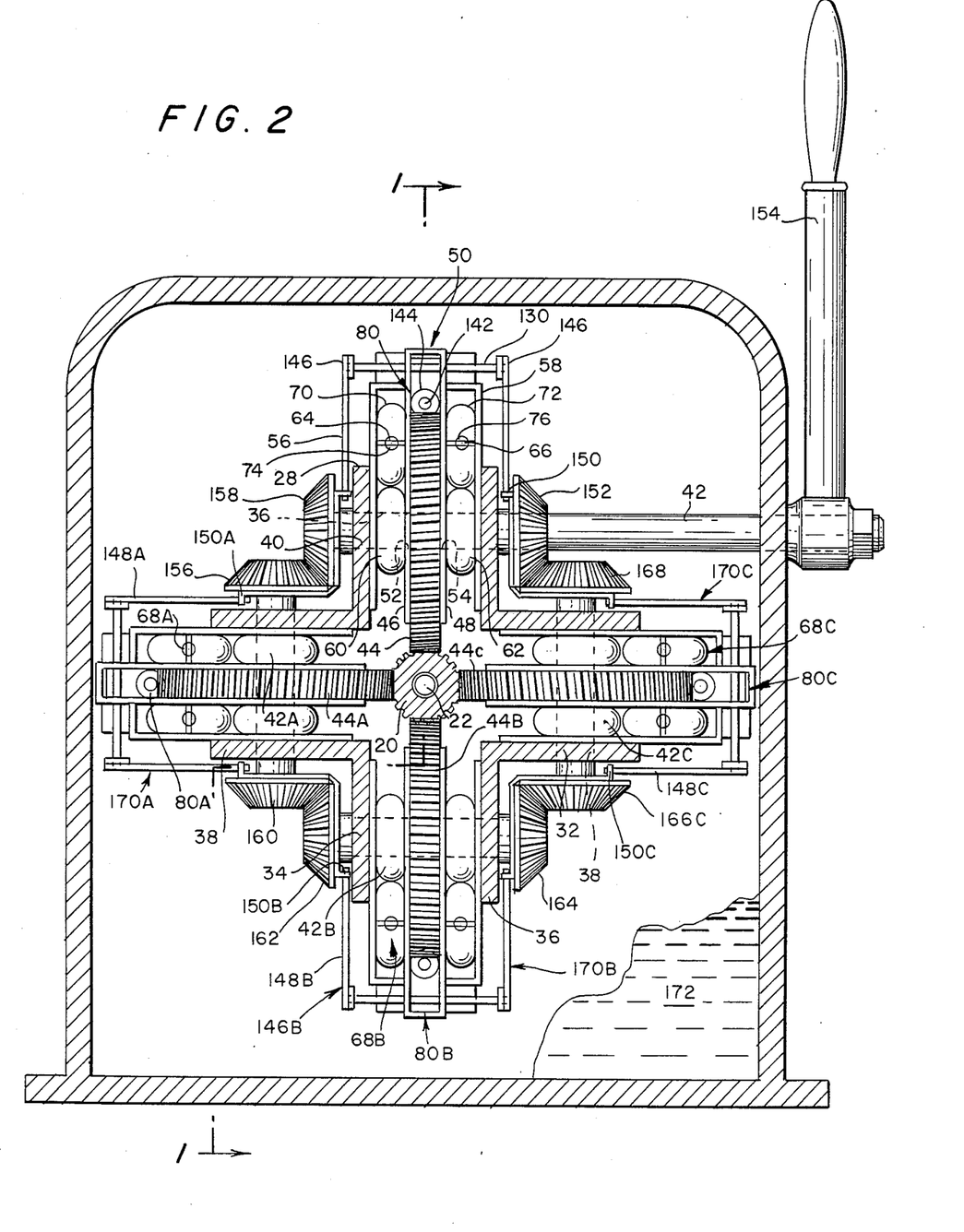
FIG. 2 is a sectional view taken along the line 2—2 of FIG. 1.
Figure 3:
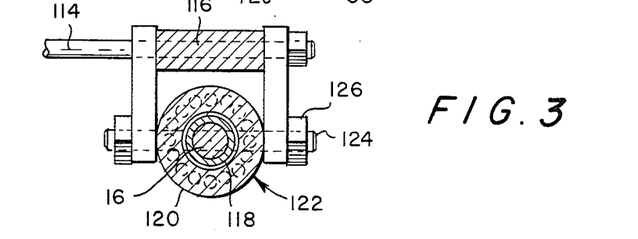
FIG. 3 is a sectional view taken along the line 3—3 of FIG. 1.
Figure 4:
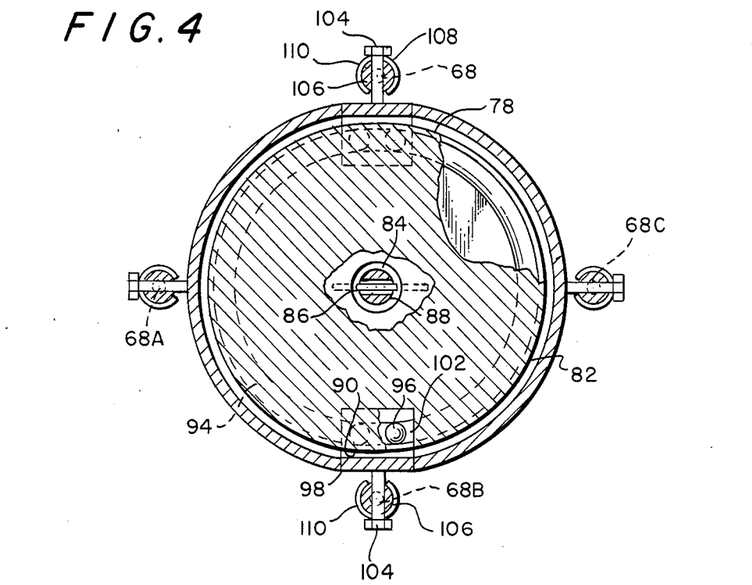
FIG. 4 is a sectional view taken along the line 4—4 of FIG. 1.
Figure 5:
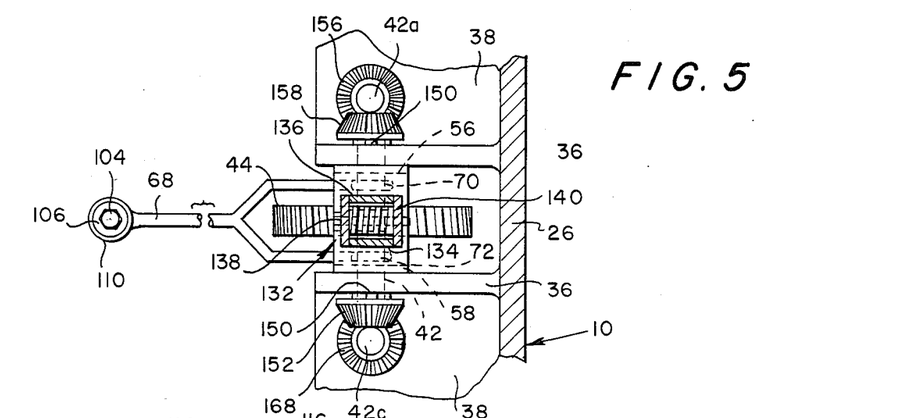
FIG. 5 is a sectional view taken along the line 5—5 of FIG. 1.

In order to provide lubrication for the various moving parts of the transmission set forth in the drawings, the housing 10 is made fluid tight, and a body of oil 172 is disposed in the housing, the oil being fragmentarily illustrated.

Figure 6:
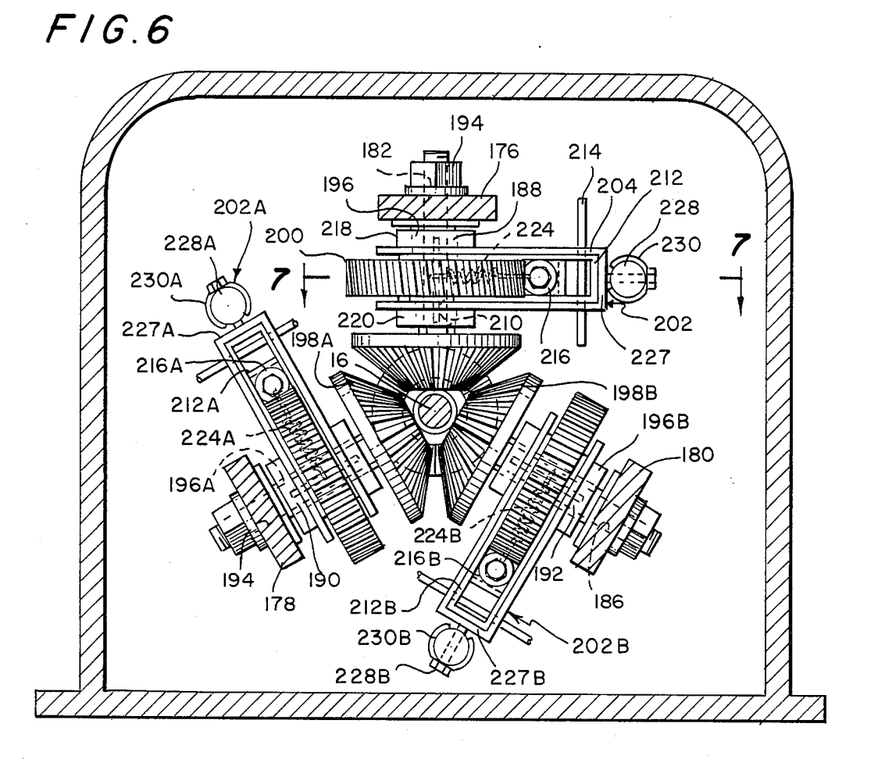
FIG. 6 is a sectional view of another embodiment of the present invention taken along a line corresponding to FIG. 2.
Figure 7:
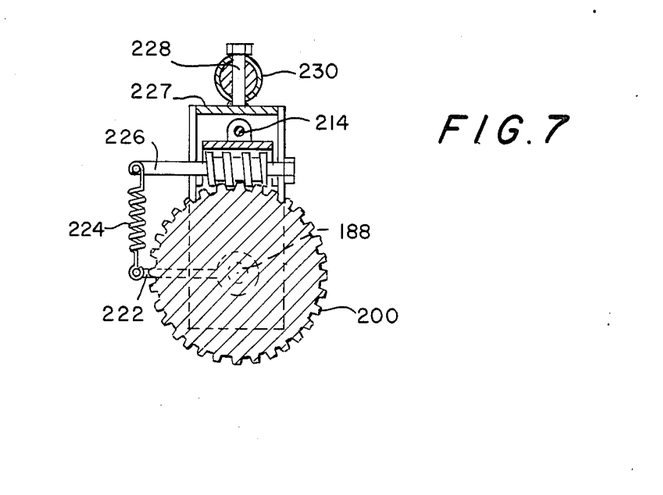
FIG. 7 is a sectional view taken along the line 7—7 of FIG. 6.

FIGS. 6 and 7 illustrate another embodiment of the present invention. The transmission of the embodiment of FIGS. 6 and 7 contains the same housing 10, drive shaft 16, and wobble plate 78, but the helical gears 20 and 44, 44A, 44B, and 44C have been replaced by bevel gears, and in place of utilizing four idler gears 44, 44A, 44B, and 44C, three such gears are employed.

As illustrated in FIG. 6, the input or drive shaft 16 is journaled on the axis of a bevel gear 174 mounted coaxially at the end of the output or driven shaft 18 for rotation therewith. The bevel gear 174 corresponds to the embodiment of FIGS. 6 and 7 with the helical gear 20 of the embodiment of FIGS. 1 through 5.

Three flat partitions 176, 178 and 180 extend inwardly from the end wall 26 of the housing and are disposed at equal distances from the common axis of the input shaft 16 and output shaft 18, and are further equally spaced about the output shaft 18. Each of the partitions 176, 178 and 180 is provided with an aperture 182, 184 and 186, respectively, the aperture being disposed in a common plane normal to the output shaft 18. A shaft 188 is mounted in the aperture 182 and locked in position with respect to the partition 176. A shaft 190 is disposed within the aperture 184 and lock in position with respect to the partition 178. A shaft 192 is disposed within the aperture 186 and locked in position with respect to the partition 180. Each of the shafts 188, 190 and 192 are threaded at their ends, and a locknut 194 is utilized to secure the shafts with respect to the partitions 176, 178 and 180, respectively.

A sleeve 196 is rotatably journaled on the shaft 188, and a bevel gear 198 is mounted on the end of the sleeve 196 opposite the partition 176 and meshed with the bevel gear 174. An idler gear 200 is mounted on the sleeve 196 to rotate therewith and the idler gear 200 corresponds to the idler gear 44 of the first embodiment of the present invention. A housing 202 having parallel walls 204 and 206 disposed on opposite sides of the idler gear 200 is journaled on the sleeve 196 by means of apertures 208 and 210 in the walls 204 and 206 respectively. A casing 212 is pivotally mounted within the housing 202 by means of a pin 214, and corresponds to the casing 132 of the first embodiment. A one-way gear 216 is mounted in the casing on an axis normal to the axis of the idler gear 200. As in the first embodiment, the idler gear is a helical gear as is the one-way gear 216.

Rings 218 and 220 are mounted on the walls 204 and 206, respectively, on the side thereof opposite the idler gear 200, and the rings 218 and 220 are journaled about the sleeve 196. A U-shaped bracket 222 has its ends mounted on the rings 218 and 220, respectively, and extends outwardly about the perimeter of the idler gear 200. A spiral spring 224 is mounted at one end on the bracket 222 and on the other end on the end of a pin 226 which extends through the one-way gear 216, the gear being rotatable thereon. In this manner, the spring 224 places a pivotal force on the one-way gear 216 to limit rotation of the idler gear 200 to the counter-clockwise direction as shown in FIG. 7.

As illustrated in FIG. 6, three bevel gears are illustrated, the bevel gears 198A and 198B being identical to the bevel gear 198 and disposed on shafts 190 and 192, respectively. Each of the miter gears 198A and 198B are mounted on the end of sleeves 196A and 196B, and each of the sleeves rotatably carries a housing 202A and 202B identical to the housing 202. Each of the housings 202A and 202B pivotally carries a casing 212A and 212B, respectively, and the casing 212A contains a one-way gear 216A and the casing 212B carries a one-way gear 216B, the gears 216A and 216B being identical to the gear 216.

The housings 202, 202A, and 202B are provided with an end plate 227, 227A, and 227B, respectively, the end plates extending between the walls 204 and 206. The end plate 227 carries an outwardly extending plate 228, and the end plates 226A and 226B carry outwardly extending pins 228A and 228B. A connecting rod 230 is mounted at one end on the pin 228, and extends generally parallel to the axis of the input shaft 16 and output shaft 18 to the wobble plate, not shown, which is identical to the wobble plate 78. In like manner, a connecting rod 230A extends from the pin 228A in the wobble plate, and a connecting rod 230B extends from the pin 228B to the wobble plate. The connecting rods 230A and 230B are also disposed generally parallel to the axis of the input shaft 16 and output shaft 18 and are translatable with movement of the periphery of the wobble plate in the manner illustrated above in connection with the embodiment of FIGS. 1 through 5.

The embodiment of FIGS. 6 and 7 functions in substantially the same manner as the embodiment of FIGS. 1 through 5, except power is transmitted through each of the bevel gears 198 throughout approximately 120° of its rotation. Further, the embodiment of FIGS. 6 and 7 does not permit reversal of the driven shaft 18 with respect to the drive shaft 16, since the springs 224, 224A and 224B maintain tension on the casing 212, 212A or 212B in the same rotational direction at all times.

Figure 8:
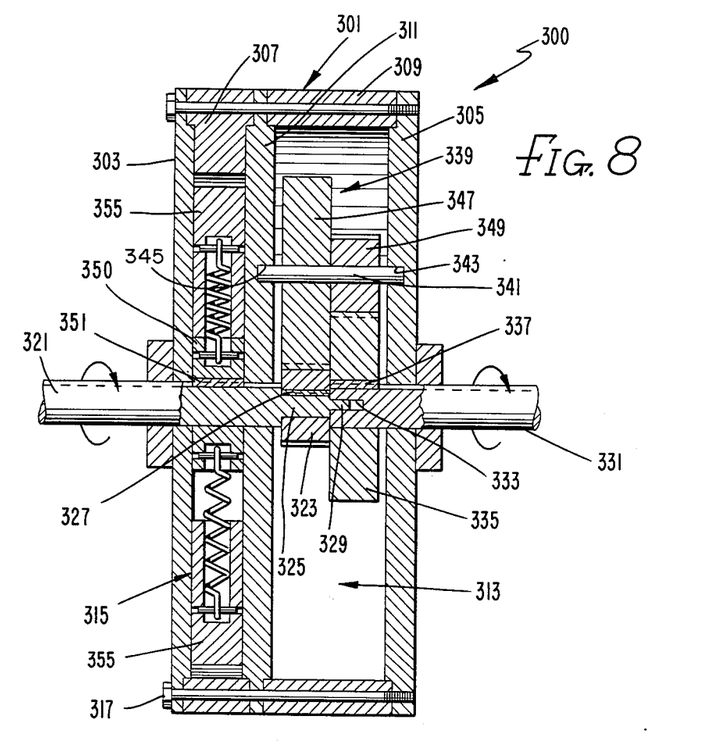
FIG. 8 shows a cross-sectional view of a further embodiment of the present invention comprising a variable hydraulic torque converter.
Figure 9:
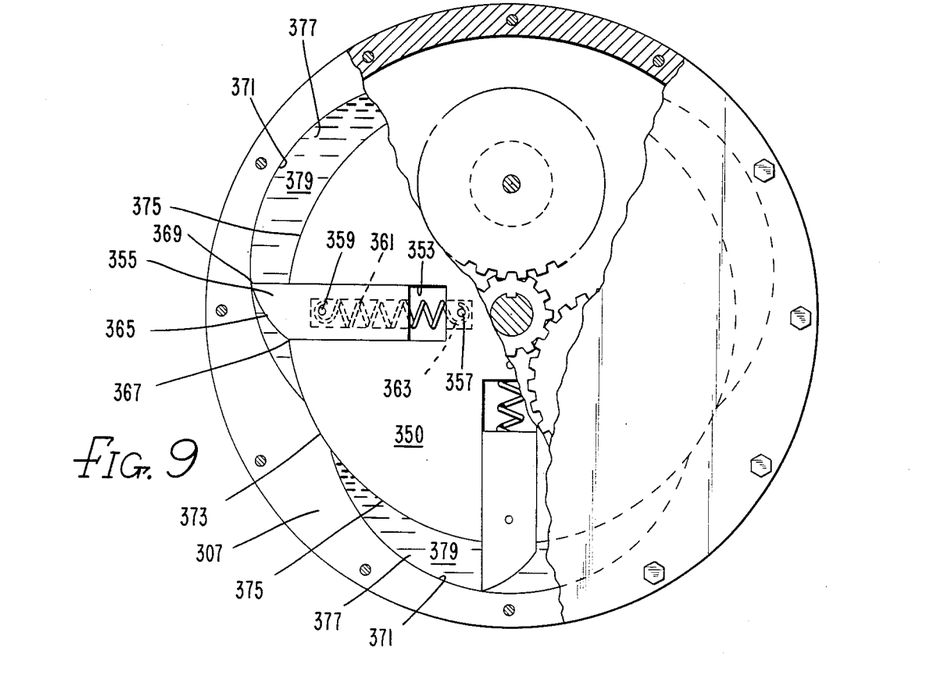
FIG. 9 shows an end view of the torque converter of FIG. 8 with portions broken away to show detail.

With reference now to FIGS. 8–13, a further embodiment of the present invention will now be described. In this embodiment, as will be described in greater detail hereinafter, a variable hydraulic torque converter is provided which includes a positive low gear, a positive direct drive gear and through the use of the structure thereof a continuously variable torque converter which effectively varies the ratio between the speed of output shaft rotation and input shaft rotation between the limits established by the particular low gear and one-to-one ratio provided by the direct drive. With reference now to FIGS. 8 and 9, it is seen that the variable hydraulic torque converter 300 includes a housing 301 which in this example includes end plates 303 and 305, annular housing members 307 and 309 and a partition member 311 which divides the housing 301 into a gear chamber 313 and a hydraulic chamber 315. The above described members comprising the housing are attached together by circumferentially spaced bolts 317 which is best seen in FIG. 8 extend entirely through the plate 303, annular member 307, partition 311, annular member 309 and plate 305.

As seen in FIG. 8, an input shaft 321 extends through the plate 303, through the hydraulic chamber 315, through the partition 311, and into the gear chamber 313 where it is rigidly keyed to the drive gear 323. For this purpose, the shaft 321 is provided with a reduced diameter portion 325 onto which the drive gear 323 is placed, and a key member 327 is installed therebetween to maintain drive gear 323 rigidly connected thereto. Beyond the reduced diameter portion 325 of the shaft 321, a further reduced diameter portion 329 is provided for a purpose to be described hereinafter.

With further reference to FIG. 8, it is seen that a driven shaft 331 is mounted into the housing 301 and extends through the plate 305 and into the gear chamber 313. The driven shaft 331 includes a recess 333 which is dimensioned so as to bearingly receive the further reduced diameter portion 329, of the drive shaft 321. In this regard, it is important to understand that the relationship between the further reduced diameter portion 329 and the recess 333 is a bearing relationship only and no direct drive of the driven shaft 331 by the drive shaft 321 through the further reduced diameter portion 321 is made. With further reference to FIG. 8, it is seen that a driven gear 335 is keyed to the driven shaft 331 by a key 337. In order to drivingly connect the drive gear 323 with the driven gear 335, a cluster gear generally referred to by reference numeral 339 is provided within the gear chamber 313. The cluster gear 339 is rotatably mounted on a shaft 341 which extends between a recess 343 formed in the plate 305 and a recess 345 formed in the partition member 311. The cluster gear 339 includes a large gear portion 347 which is drivingly connected to the drive gear 323 and a smaller gear portion 349 which is drivingly connected to driven gear 335. Accordingly, it is seen that under certain conditions of operation of the torque converter 300, a positive low gear drive may be established between the input shaft 321 and the output shaft 331 via the drive gear 323, the large portion 347, the small portion 349, the driven gear 335 and the driven shaft 331. The conditions under which operation in this manner will occur will be described in greater detail hereinafter.

With further reference now to FIGS. 8 and 9, it is seen that the input shaft 321 has rigidly keyed thereto a rotor 350 by virtue of key member 351. As best seen in FIG. 9, the rotor 350 includes a plurality of radially extending recesses 353 therein each of which has slidably mounted therein a pawl member 355. Each recess 353 has mounted therein a pin member 357 and each pawl member 355 has mounted thereon a further pin member 359. Connected between the pin members 357 and 359 is a tension spring 361 which tends to pull each respective pawl member 355 toward the surface 363 of each respective recess 353. As further seen with reference to FIG. 9, each pawl member 355 includes an outermost surface 365 the limits of which are defined by a leading edge 367 and a trailing edge 369.

With further reference to FIG. 9, it is seen that the circumferentially extending member 307 has machined therein surfaces 371 which are separated from one another by further surfaces 373. The surfaces 371 define along with the peripheral surface 375 of the rotor 350 respective chambers 377 which are filled hydraulic fluid 379. It should be apparent to those skilled in the art that the interaction between the surface 373 on the member 307 and the outer peripheral surface 375 of the rotor 350 acts to seal off the individual chambers 377 to thereby prevent hydraulic fluid 379 from migrating from one chamber to another as the rotor 350 rotates. Accordingly, the hydraulic fluid 379 in each respective chamber 377 may be considered to be a static fluid.

Figures 10, 11, 12:
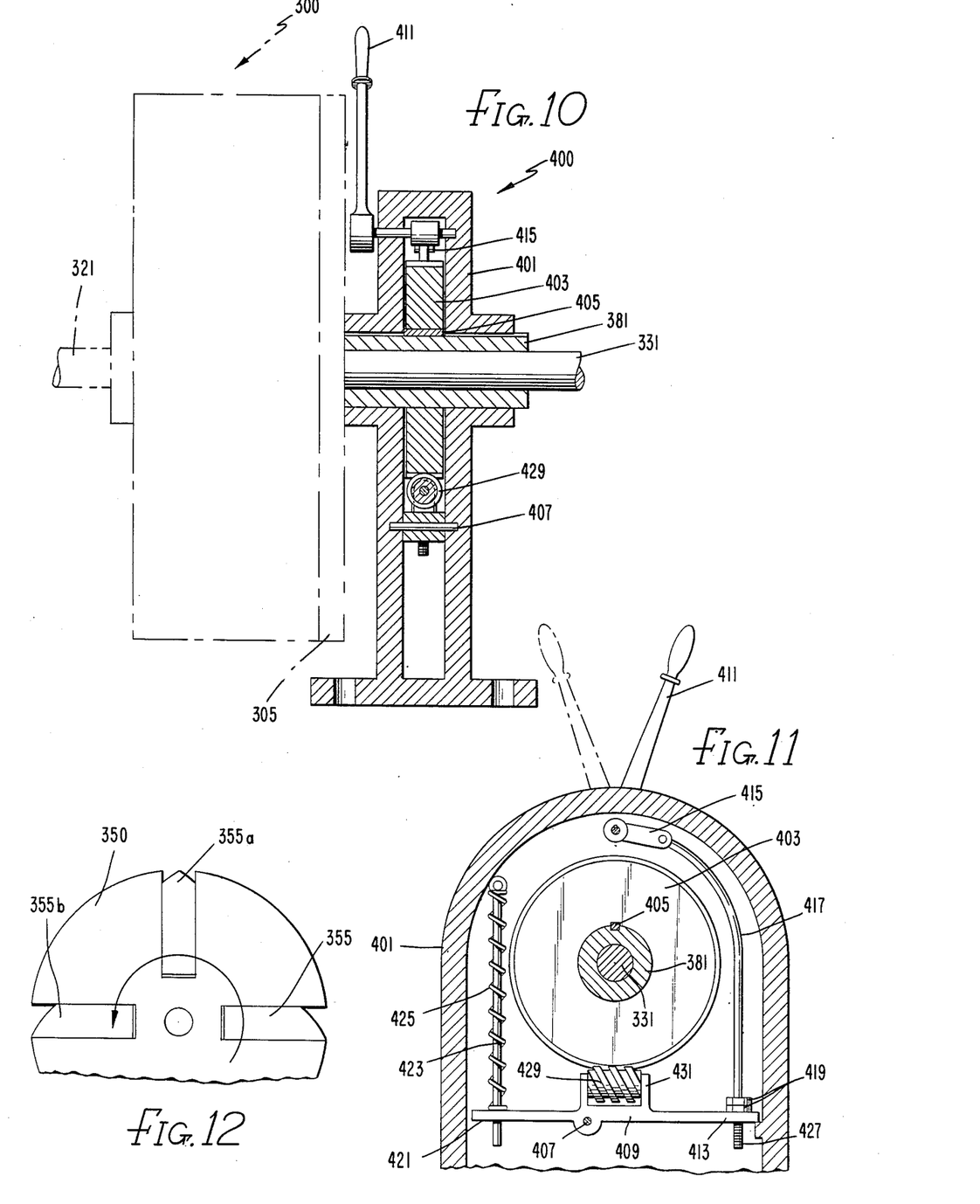
FIG. 10 shows a side view of the torque converter of FIGS. 8-9 connected to a one-way brake, similar to that which is described with reference to FIG. 7.
FIG. 11 shows an end view of the brake of FIG. 10.
FIG. 12 shows a schematic view of the rotor portion of the torque converter showing differing configurations of the pawl ends.

Now with further reference to FIGS. 10 and 11, a brake means similar to that which was described hereinabove and usable in conjunction with the torque converter 300 will be described. As shown in FIG. 10, the torque converter 300 with its input shaft 321 and output shaft 331 has further mounted to plate 305 an annular extension member 381 which extends in bearing relation through the housing 401 of the inventive brake mechanism 400. As shown, the brake 400 has mounted in the housing 401 a helical gear 403 which is keyed to the extension 381 by a key member 405. As such, the torque converter 300 may rotate with respect to the housing 401 but is constrained to rotate with helical gear 403 of the brake 400.

With particular reference now to FIG. 11, it is seen that a pin member 407 pivotally mounts a carrier cage 409 with the clutch housing 401. The pivoting of the carrier cage 409 is controlled by a handle 411 which is connected to one end 413 of the carrier cage 409 by a link 415 and a curved rod 417 having an end 427 extending through a hole formed in the end 413 of the carriage cage 409 a distance controlled by the position of the nuts 419. At the other end 421 of the carrier cage 409, a hole is provided which enables the end 421 to ride up and down on a shaft 423 which has mounted therearound a compression spring 425. As such, viewing the carrier cage 409 as shown in FIG. 11, the spring 425 is operative to tend to pivot the carrier cage 409 in a counter-clockwise direction which tendency is resisted by the nuts 419 mounted on the rod 417.

As further seen in FIG. 11, a worm gear 429 is mounted in a saddle portion 431 for the carrier cage 409. In the operation of the inventive brake 400, when the shifting lever 411 is in the position shown by the full lines in FIG. 11, the gears 403 and 429 are in perfect alignment and the helical gear 403 may rotate freely in either direction. When the shifting lever 411 is moved to the opposite position of its excursion as designated by the phantom lines in FIG. 11, the pressure exerted upon the carrier cage 409 by the nuts 419 is removed therefrom to thereby enable the spring 425 to push downwardly on the end 421 of the carrier cage 409 to thereby enable the carriage cage 409 to pivot about the pin 407 so that the worm gear 429 is tipped with respect to the helical gear 403. In particular, this pivoting of the carrier cage 409 causes the centers of the shafts upon which the helical gear 403 and the worm gear 429 are mounted to become less than one-half the sum total of the pitch diameter of the worm gears 403 and 429. It has been found that when this particular relationship exists, the worm gear 403 is free to rotate in the same direction in which the drive shaft 321 is rotating but will not rotate in the opposite direction. Conversely, movement of the shifter lever 411 from the phantom position shown therein will cause the nuts 419 to pivot the carrier cage 409 against the force of the spring 425 to a position where alignment of gears 403 and 429 is regained to thereby enable the gear 403 to rotate in either direction. In further explanation, when the helical gears are mounted on transverse shafts as shown in FIG. 11, if the distance between the centers of the shafts is less than ½ the total sum of the pitch diameters of gear 403 and gear 429, the static pressure between the crown and the root of the matching gears will tend to counteract the radial pressure of the matching gears where their faces meet. The static pressure will tend to lock the gears, while the radial pressure will tend to rotate these gears in relationship to each other.

When the shaft of the gear 429 is mounted in floating saddle 431, which in turn is mounted on shaft 407 that is parallel to shaft 331, providing the center of shaft 407 and the center of shaft 331 are properly spaced, gear 431 will be free to rotate in either direction so long as the perpendicular relation of shaft 331 and the shaft on which gear 429 is mounted is maintained.

When the floating saddle 431 is moved from the perpendicular plane, gear 429 will still rotate freely in one direction and will lock in the other direction, depending upon which way the floating saddle 431 is tipped. When gear 403 turns into gear 429 from the side that has more than 90 degrees separation, the gears will rotate freely activated by radial pressure, but when the angle is less than 90 degrees, the gears will lock activated by static pressure.

With reference now to FIGS. 8–11, the operation of the inventive hydraulic torque converter 300 in conjunction with the inventive one-way brake 400 will now be described. As a starting point, the assumption has been made that the power plant attached to the input shaft 321 is operating so as to rotate the input shaft 321, the output shaft 331 is attached through a differential mechanism to the wheels of a vehicle which is to be moved by the power plant, and the clutch mechanism 400 is disengaged as exemplified by the position of the handle 411 shown in full lines in FIG. 11. In this situation, the shaft 321 will be rotating, the shaft 331 will be fixed, and the housing 301 will be rotating in a direction opposite to the direction of rotation of the shaft 321 since the cluster gear 339 will be rotating about the stationary output gear 335 and the pine 341 which connects the cluster gear 339 to the housing 301 will act to transfer the rotation of the cluster gear 339 about the output gear 335 to the housing 301. As shown in FIG. 10, the extension 381 of the plate 305 will rotate along with the housing and will cause the gear 403 to rotate in the same direction as the housing 301 and in an opposite direction from the direction of rotation of the shaft 321.

Now, the operator of the vehicle will move the handle 411 to the position shown in phantom in FIG. 11. As described hereinabove, this handle movement causes the tipping of the worm 429 which thereby prevents backward movement of the gear 403 while allowing forward movement of the gear 403. Thus, the act of moving the handle 411 to the phantom position will be operative to stop the above described reverse rotation of the housing 301 which will accordingly cause the output shaft 331 to rotate in the same direction as the direction of rotation of the input shaft 321 with this rotation being via the drive gear 323, the cluster gear 339 and the output gear 335. Thus, the output shaft 331 will rotate at a speed with respect to the input shaft 321 determined by the gear ratio caused by the above described gears 323, 347, 349 and 335. Initially, the housing 301 will remain stationary, precluded from reverse rotation by the action of the clutch 400 and initially not moving in the same direction as the input shaft 321 as will be explained hereinafter.

As has been explained hereinabove, the movement of the pawls 355 radially outwardly from their chambers 353 is controlled by the spring constant of the spring 361 as well as by the weight of the pawls 355 which affects the degree to which centrifugal force acts thereupon. Accordingly, by choosing the pawl weight and the spring strength, and, further, by designing the specific shape of the chambers 377 and thereby the "throw" of the pawls 355, the power curve for the hydraulic torque converter 300 may be designed for particular applications.

With the brake 400 engaged and the input shaft driving the output shaft 331 by the gears, the drive shaft 321 also rotates the rotor 350. Initially, the speed of rotation of the rotor 350 will be sufficiently slow that the pawls 355 will remain totally within the recesses 353 by virtue of the force exerted thereon by the springs 361. As the speed of rotation of the drive shaft 321 and rotor 350 increases, at some point along the acceleration curve of the input shaft 321, the centrifugal force exerted upon the pawls 355 will be sufficiently great so as to overcome the spring force exerted thereon by the spring 361. At this point, the pawls 355 will begin to move outwardly and at some further point along the acceleration curve of the input shaft 321, the edges 369 of the respective pawls 355 will begin to protrude into the chambers 377 as the rotor 350 rotates therein. When this occurs, the space between the edges 369 of the respective pawls 355 and the outer walls 371 of the respective chambers 377 will form therebetween a slightly restricted opening. This slightly restricted opening will cause a force imbalance to occur between the rotor 350 and the annular member 307 which forms the chambers 377 to thereby cause, due to this force imbalance, a slight rotation of the entire housing 301 in the same direction as the direction of rotation of the input shaft 321 and the output shaft 331. This slight rotation of the housing 301 will act to slightly reduce the gear ratio between the output shaft 331 and the input shaft 321. This is because the housing 301 via the pin 341 will carry the cluster gears 339 circumferentially about the output gear 335. Thus, for every rotation of the input shaft 321 there will be a slight rotation of the housing 301 which will cause the output shaft 331 to rotate slightly farther than it would have, had the housing 301 been stationary.

As the speed of rotation of rotor 350 increases, the amount with which the edge 369 of the pawls 355 will extend into the chambers 377 will increase to thereby increase the pressure differential effect and to thereby increase the speed of rotation of the housing 301. With each slight incremental increase in the extension of the respective pawls 355 away from the rotor 350, the gear ratio between the input shaft 321 and the output shaft 331 will accordingly be decreased. For example, if the initial gear ratio with the housing 301 stationary is six revolutions of the input shaft 321 for every revolution of the output shaft 331, initial slight rotation of the housing 301 may reduce the gear ratio to 5 revolutions of the input shaft 321 for every revolution of the output shaft 331. In this scenario, thus, for every six revolutions of the input shaft 321, the output shaft will now rotate 1.2 revolutions. With further increase in the speed of rotation of the input shaft 321, the pawls 355 will extend slightly further outwardly from the respective recesses 353 so that the housing 301 will begin to rotate slightly faster and the gear ratio will be changed to four revolutions of the input shaft 321 for every revolution of the output shaft 331 so that for every six revolutions of the input shaft 321, the output shaft will now rotate one and one half revolutions. As the speed of rotation of the input shaft 321 increases, at some time, the rate of rotation thereof will be at a high enough level to create sufficient centrifugal force on the pawls 355 that they will begin to engage the outer walls 371 of the chambers 377. When this occurs, the fluid 379 being sealingly retained within each respective chamber 377, the rotor 350 and the housing 301 via the annular member 307 will lock together and move as a unit so that the output shaft 331 is also constrained to move with the housing 301 due to the interaction with the pin 341 and cluster gears 339. Accordingly when the pawls 355 engage the surfaces 371, the hydraulic torque converter 300 will then be in a mode wherein direct drive between the input shaft 321 and the output shaft 331 is achieved.

With the input shaft 321 and output shaft 331 operating in this direct drive mode, if an additional load is placed upon the shaft 331 which is too great for the shaft 331 to turn at a 1 to 1 gear ratio, this fact will be sensed in the chambers 377 by the forces placed onto the housing 301 via the output shaft 331, gear 335, cluster gears 339 and pin 341. This sensing of the additional load will be evidenced by the fluid 379 acting upon the surfaces 365 of the pawls 355 to thereby slightly move the edges 369 away from the walls 371 to thereby allow slight reduction in the rotation speed of the housing 301 with respect to the output shaft 331. This slight reduction in rotation speed of the housing 301 with respect to the output shaft 331 will cause the gear ratio to increase above the direct drive ratio which was previously attained. As the load increases, the distance between the edges 369 of the pawls 355 from the walls 371 will correspondingly increase to thereby enable the hydraulic torque converter 301 to automatically increase the gear ratio to a sufficient level as to enable the load to be driven by the input shaft 321 via the torque converter 300. Thus it is seen that the torque converter 300 includes a fixed direct drive low end gear ratio which may be predetermined as desired, a fixed high gear ratio which may be determined as desired, and an infinite variability therebetween through the interaction between the pawls 355, the fluid 379 and the walls of the chambers 377.

FIG. 12 shows a schematic view of rotor 350 with pawls 355, 355a and 355b mounted therein. The pawl 355 is the same as the pawl 355 shown in FIG. 9, while the pawls 355a and 355b are shown to include slightly different configurations of the end portions thereof which interact with the fluid 379 as described hereinabove. FIG. 12 is included herewith to show a few ways in which the end portions of the pawls 355 may be modified so as to obtain differing power curves for the torque converter 300 as should be evident to those skilled in the art.

Figures 13, 14:
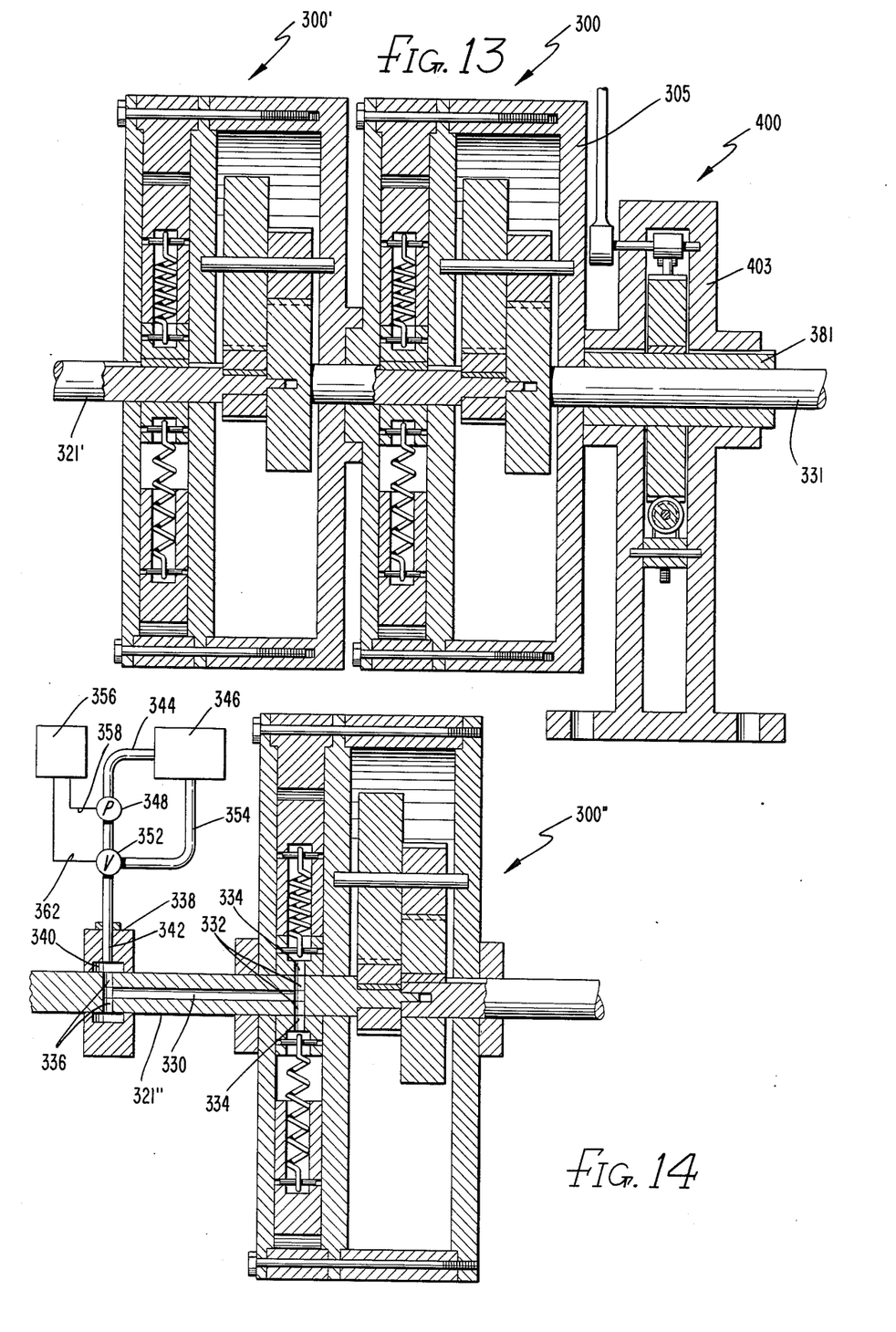
FIG. 13 shows a cross-sectional view similar to the view of FIG. 8, but with a modification wherein a plurality of converters are serially stacked in conjunction with the brake of FIGS. 10-11.
FIG. 14 shows a cross-sectional view of a further embodiment of the hydraulic torque converter.

With reference now to FIG. 13, it is seen that a plurality of torque converters 300 in accordance with the present invention may be serially stacked to thereby multiply the gear ratios obtained through the use of the device. For example, if each torque converter 300 has an input to output low end gear ratio of 4 to 1 and a high end gear ratio of 1 to 1, by serially stacking of two torque converters 300, gear ratios ranging from 16 to 1 to 1 to 1 may be obtained. As shown in FIG. 13, the torque converter 300' has an input shaft 321' and an output shaft 331' which also comprises the input shaft 321 for the torque converter 300. As shown in FIG. 10, the extension 381 of the plate 305 of the torque 300 is keyed to the helical gear 403 of the brake 400. With this in mind, the operation of the embodiment of FIG. 13 should be self evident. With the input shaft 321' of the torque converter 300' rotating in a forward direction, the output shaft 331' thereof which also forms the input shaft 321 for the torque converter 300 will be rotating more slowly at a rate dependent upon the particular gear ratio chosen for the respective gears within the torque converter 300'. The shaft 331', 321 of the torque converter 300 will rotate the output shaft 331 even more slowly depending upon the particular gear ratios provided within the torque converter 300. So, for example, if the gear ratio chosen for both the torque converters 300' and 300 is 4-1, then for every 16 rotations of the input shaft 321' the output shaft 331 will rotate once. With the brake 400 disengaged, the housings 301' and 301 will rotate in a direction opposite to the directions of rotation of the respective shafts 321' and 321. With the brake 400 engaged, this backward rotation of the housings 301' and 300 will be stopped and at this time the output shaft 331 will rotate in the same direction as the input shaft 321' and at a ratio dependent upon the respective gear ratios within the torque converters 300' and 300. As the shaft 321' accelerates above a certain speed of rotation, the pawls 355' will begin to extend outwardly from their respective recesses 353' against the force of respective springs 361. When this happens, the housing 301' will begin to rotate slowly in the same direction as the input shaft 321' due to the above described pressure differential forces. Thus, the gear ratio between the input shaft 321' and the output shaft 331' will begin to reduce as the speed of the output shaft 331' begins to approach the speed of the input shaft 321'. Since the output shaft 331' is also the input shaft 321 for the torque converter 300, this action will cause the speed of rotation of the rotor 350 to increase to thereby at some point cause the pawls 355 to begin to extend outwardly from the respectively recesses 353. When this happens, the gear ratio created by the torque converter 300 will begin to reduce to thereby further lower the gear ratio between the input shaft 321 and the output shaft 331. It is noted that the speed of the output shaft 331 is affected by both the changing gear ratio of the torque converter 300' and the changing gear ratio of the torque converter 300, accordingly, this multiplication effect causes the device of FIG. 13 to have a much wider range of gear ratios than one torque converter alone. In the example given with reference to FIG. 13 with each torque converter having an input to output gear ratio of 4 to 1 on the low end and 1 to 1 on the high end, the device of FIG. 13 has a gear ratio which may infinitely variable between 16 to 1 and 1 to 1 with a curve representative of the variation of the gear ratios being dependent upon the above described design parameters, to wit, the shape of the surfaces 365, 365' of the respective pawls 355, 355', the configuration of the respective chambers 377 and 377', the spring constant for the respective springs 361, 361' and the weight of the respective pawls 355 and 355'. Thus, through further stacking of the torque converters, and due to the multiplication effect, very low gear ratios may be obtained which may be useful in the operation of vehicles such as military tanks and large bulldozers.

With reference now to FIG. 14, a further embodiment of the improved hydraulic torque converter of the present invention will now be described. In this embodiment, these features which are the same as the features described hereinabove with reference to FIGS. 8 and 13 will be referred to with like double-primed reference numerals. The improved torque converter 300" shown in FIG. 14 is structurally the same as the improved torque converter 300 shown in FIG. 8. The sole differences lie in certain modifications to the input shaft 321", the rotor 350" and the recesses 353". With reference now to FIG. 14, it is seen that the input shaft 321" has formed therein a longitudinal flow passage 330 which has a plurality of output passages 332 at one end thereof extending substantially radially of the shaft 321". Each passageway 332 is arranged to connect with a corresponding passageway 334 in the rotor 350" with each passageway 334 fluidly connecting the passageway 330 with a respective rotor recess 353". At the other end of the passageway 330, a plurality of passageways 336 are arranged to be fluidly connected to the passageway 330 and to extend radially within the shaft 321". A bearing 338 is provided in surrounding relation to the openings formed by the passageway 336 and the shaft 321" rotates within the bearing 338 and with respect thereto. Within the bearing 338, an annular chamber 340 is provided which on the one hand fluidly connects with each of the passageways 336 and on the other hand connects with a further exterior passageway 344 via a bearing passageway 342. The passageway 344 connects to a reservoir 346 of hydraulic fluid via a pump 348 and a supply and exhaust valve 352. The supply and exhaust valve 352 supplies fluid from the reservoir 346 to the annular chamber 340 via the passageway 344 and exhausts fluid from the annular passageway 340 to the tank 346 via the passageway 354. A controlling device 456 which may, if desired, may be a microcomputer or other form of computer is utilized to control the operation of the pump 348 and the valve 352 and thereby control the operation of the torque converter 300". For this purpose, a control wire 358 is arranged to be connected between the device 356 and the pump 358 while a further control wire 362 is arranged to be connected between the control device 356 and the valve 352.

The embodiment of FIG. 14 may, if desired, be operable in the same manner that the embodiment of FIG. 8 is operable and this may be accomplished by merely keeping the valve 352 in a position where fluid in the chamber 340 is exhausted to the tank 346. In this manner, the pressure of the fluid will have no effect upon the pawls 355". If, however, it is desired to control the position of the pawls 355" with respect to the chambers 377" and to thereby vary the torque curve of the torque converter 300", the controlling device 356 may be activated to thereby open the passageway in the valve 352 which connects the reservoir 346 with the annular chamber 340 and to also activate the pump 348 to provide fluid from the reservoir 346 at a predetermined pressure depending upon the desired performance characteristics to the annular chamber 340. With the valve 352 open and the pump 348 operating, fluid from the reservoir 346 will flow through the passageway 344, into the annular chamber 340, into the shaft passageways 336, 330 and 332, and thence into the respective recesses 353". As the pressure of the fluid on the backside of the pawls 355" increases, the pawls will be moved radially outwardly within the rotor 350" regardless of the speed of rotation thereof. Accordingly, the controlling device 356 may be programmed to pressurize the recesses 353" with sufficient pressure to extend the pawls 355" to a position where any predetermined gear ratio may be controllably set for the improved torque converter 300" regardless of the speed of rotation of the input shaft 321".

Those skilled in the art will devise many modifications of the present invention within the scope of the invention. For example, a conventional one-way roller clutch or sprag clutch may be substituted for the one-way gears or brakes 80, 80A, 80B and 80C illustrated and achieve a portion of the advantages of the present invention. Also, as many torque converters 300, 300', 300", etc. as desired may be serially stacked in accordance with the teachings herein. Further, miter gears could be substituted for the cluster gear 339 with no loss of function. Also, if desired, the improved torque converter 300 could be utilized without the inventive one-way brake 400. In this mode, a brakeband would be mounted in surrounding relation to the housing 301. With the brakeband preventing rotation of the housing 301 through frictional engagement therewith, the torque converter would provide the gear ratio created by the various interacting gears thereof. When direct drive would be desired, and with the rotation speed of the input shaft 321 sufficiently high, the brakeband would be released to thereby allow the housing 301 to rotate at the same speed as the input shaft 321 and thereby the output shaft 331. Control means could be provided to sense the engagement of the surfaces 365 of the pawls 355 with the surfaces 371 of the chambers 377 and responsive thereto to release the brakeband, to avoid stalling of the powerplant. It is therefore intended that the scope of the present invention be not limited by the foregoing specification, but rather only by the appended claims.

I claim:

1. A one-way brake comprising:
   (a) a brake housing;
   (b) first shaft means mounted in said housing for rotatably supporting a first helical gear thereon;
   (c) second shaft means mounted in said housing substantially parallel to said first shaft means;
   (d) carrier cage means mounted on said second shaft means for pivotal movement thereon;
   (e) third shaft means mounted on said carrier cage means substantially normal to said first and second shaft means;
   (f) a second helical gear rotatably mounted on said third shaft means and engaging the periphery of said first helical gear; and
   (g) actuating means attached to said carrier cage means for controllably pivoting said carrier cage means about said second shaft means whereby when said carrier cage means is pivoted to a position wherein the teeth of said helical gears are substantially aligned with one another, said first helical gear is free to rotate in either direction and, further, when said carrier cage means is pivoted to a position wherein the teeth of said helical gears are misaligned with respect to one another, said first helical gear is constrained to rotate in one direction only.

2. The invention of claim 1, further including biasing means in said housing for biasing said carrier cage means in one direction of pivoting, said actuating means acting against said biasing means in one direction of actuation thereof.

3. The invention of claim 1, wherein said first shaft means is keyed to said first helical gear, whereby rotation of said first shaft means causes rotation of said first helical gear.

4. The invention of claim 3, wherein said first shaft means has a hole therethrough, said first shaft means comprising a portion of a housing of a torque converter, said torque converter comprising:
   (a) said torque converter housing;
   (b) a hydraulic chamber in said housing;
   (c) a gear chamber in said housing;
   (d) an input shaft in said hydraulic chamber;
   (e) an output shaft in said gear chamber;
   (f) gear means for drivingly connecting said input and output shafts, said gear means including a gear member rotatably mounted on pin means attached to said housing;
   (g) rotor means in said hydraulic chamber keyed to said input shaft; and
   (h) said output shaft extending through said hole and being rotatable with respect to said first shaft means.

5. The invention of claim 4, wherein said torque converter housing includes:
   (a) first, second and third plates, said first and second plates defining therebetween said hydraulic chamber, said second and third plates defining therebetween said gear chamber, said pin means being connected between said second and third plates;
   (b) first substantially annular means for defining the outer periphery of said hydraulic chamber; and
   (c) second substantially annular means for defining the outer periphery of said gear chamber.

6. The invention of claim 5, wherein said gear member comprises a cluster gear and said gear means further includes:
   (a) a drive gear keyed to said input shaft;
   (b) a driven gear keyed to said output shaft; and
   (c) said cluster gear drivingly connecting said drive gear to said driven gear.

7. The invention of claim 4, wherein said rotor means includes:
   (a) a plurality of circumferentially spaced recesses extending radially therein and opening at the periphery of the rotor;
   (b) a pawl member mounted in each recess for slidable movement therein; and
   (c) tension spring means connected between each said pawl member and its respective recess, each said tension spring means for biasing the respective pawl radially inwardly toward said input shaft.

8. The invention of claim 7, wherein a plurality of torque converters are serially stacked with the output shaft of a first torque converter comprising the input shaft of a second torque converter, the second torque converter including said first shaft means.

9. The invention of claim 7, wherein said recesses are fluidly connected with a passageway in said input shaft, said passageway being controllably supplied with hydraulic fluid to thereby controllably position said pawl members in said recesses.

10. An improved torque converter comprising:
    (a) a housing;
    (b) a substantially static hydraulic chamber in said housing comprising a plurality of subchambers isolated from one another during all conditions of operation of said improved torque converter;
    (c) a gear chamber in said housing;
    (d) an input shaft in said hydraulic chamber;
    (e) an output shaft in said gear chamber;
    (f) gear means for drivingly connecting said input and output shafts, said gear means including a gear member rotatably mounted on pin means attached to said housing;
    (g) rotor means in said hydraulic chamber keyed to said input shaft, said rotor means including means biased radially inwardly toward said input shaft by biasing means and responsive to the rotation of said rotor means for varying the ratio of rotation speeds between said input and output shafts.

11. The invention of claim 10, wherein said housing includes:
    (a) first, second and third plates, said first and second plates defining therebetween said hydraulic chamber, said second and third plates defining therebetween said gear chamber, said pin means being connected between said second and third plates;

(b) first substantially annular means defining the outer periphery of said hydraulic chamber; and (c) second substantially annular means defining the outer periphery of said gear chamber.

12. The invention of claim 10, wherein said gear member comprises a cluster gear and said gear means further includes:

(a) a drive gear keyed to said input shaft;
(b) a driven gear keyed to said output shaft; and
(c) said cluster gear drivingly connecting said drive gear to said driven gear.

13. The invention of claim 10, wherein said rotation responsive means has associated therewith a plurality of circumferentially spaced recesses extending radially in said rotor means and opening at the periphery of said rotor means; said rotation responsive means including a pawl member mounted in each recess for slidable movement therein; and tension spring means connected between each said pawl member and its respective recess, each said tension spring means for biasing the respective pawl radially inwardly toward said input shaft.

14. The invention of claim 10 or 13, wherein a plurality of torque converters are serially stacked with the output shaft of a first torque converter comprising the input shaft of a second torque converter.

15. The invention of claim 13, wherein said recesses are fluidly connected with a passageway in said input shaft, said passageway being controllably supplied with hydraulic fluid to thereby controllably position said pawl members in said recesses.

16. The invention of claim 14, wherein said second torque converter includes a housing with extension means thereon, and an output shaft, said extension means being connected to a helical gear of a one-way brake mechanism and said output shaft extending through said extension means.

17. The invention of claim 10 or 13 wherein said housing includes an extension through which said output shaft rotatably extends, said torque converter being connected to a one-way brake mechanism comprising:

(a) a brake housing;
(b) a first helical gear mounted in said brake housing and keyed to said extension;
(c) first shaft means mounted in said housing substantially parallel to said extension;
(d) carrier cage means mounted on said first shaft means for pivotal movement thereon;
(e) second shaft means mounted on said carrier cage means substantially normal to said first shaft means and said extension;
(f) a second helical gear rotatably mounted on said second shaft means and engaging the periphery of said first helical gear;
(g) actuating means attached to said carrier cage means for controllably pivoting said carrier cage means about said first shaft means; and
(h) said pivoting of said carrier cage being controlled by said actuating means between a first position wherein said first helical gear is free to rotate in any desired direction, and a second position wherein said first helical gear is constrained to rotate in only one direction.

18. The invention of claim 17, wherein pivoting of said carrier cage from said first position to said second position causes said second helical gear to move from a position of alignment with said first helical gear to a position of slight misalignment with respect thereto.

* * * * *